United States Patent [19]

Ebisuzaki

[11] Patent Number: 5,145,448
[45] Date of Patent: Sep. 8, 1992

[54] METHOD FOR REMOVING OYSTERS FROM OYSTER SHELLS

[76] Inventor: Susumu Ebisuzaki, 3-3-903, 2-chome, Tookaichi-cho, Naka-ku, Hiroshima-shi, Japan

[21] Appl. No.: 635,925

[22] Filed: Dec. 28, 1990

[30] Foreign Application Priority Data

| Dec. 29, 1989 | [JP] | Japan | 1-343827 |
| Apr. 28, 1990 | [JP] | Japan | 2-114308 |
| May 2, 1990 | [JP] | Japan | 2-116052 |
| Oct. 23, 1990 | [JP] | Japan | 2-286259 |

[51] Int. Cl.$^5$ .............................................. A22C 29/04
[52] U.S. Cl. ........................................ 452/18; 452/16; 452/13
[58] Field of Search ................ 452/18, 13, 12, 15, 452/16, 20, 17

[56] References Cited

U.S. PATENT DOCUMENTS

| 1,352,108 | 9/1920 | Arthur | 452/17 |
| 2,354,928 | 8/1944 | Ragupos | 452/13 |
| 3,605,180 | 9/1971 | Harris et al. | 452/13 |
| 3,964,130 | 6/1976 | Bertrand | 452/15 |
| 4,304,029 | 12/1981 | Cox | 452/13 |

Primary Examiner—Willis Little
Attorney, Agent, or Firm—Koda and Androlia

[57] ABSTRACT

A method for removing oysters from the shell including steps of an insertion distances and insertion angles of two cutters are detected by measuring the size of the oyster, the oyster is fixed in place with the flat surface of its shell acing upward, the two cutters are inserted until the cutters reach near the respective portions of an adductor muscle connecting the oyster body to the shell, and the two portions of the adductor muscle are cut by swinging the cutters in the direction perpendicular to the direction of advance of the cutters. Oyster can be more securely removed without any damage to the oyster bodies by cutting the adductor muscle while forming gaps between the oyster body and the respective halves of the oyster shell by spraying air, water, etc. into the cutting area.

10 Claims, 6 Drawing Sheets

METHOD FOR REMOVING OYSTERS FROM OYSTER SHELLS

BACKGROUND OF THE INVENTION

1. Field of the Invention

The present invention relates to a method for removing oysters from the shell.

2. Prior Art

In the most common method to remove oysters from the shell, the shells are opened manually one by one, and then the body of the oyster is removed from each shell.

In this case, each oyster must be processed very quickly if large numbers of oysters are to be handled. On the other hand, each oyster must be removed from the shell carefully so that the body of the oyster is not damaged. However, such work requires a high level of skill. Accordingly, considerable personnel expenditures are required to employ skilled workers, and this leads to an increase in the cost of the oyster.

SUMMARY OF THE INVENTION

Accordingly, the first object of the present invention is to provide a method for removing oysters from the shell, in which the adductor muscle of the oyster is mechanically cut by means of a cutting device so that even an unskilled worker can easily remove the body of the oyster from the shell, thus saving labor, improving the working efficiency and making it possible to process a large number oysters in a short period of time.

The second object of the present invention is to provide a method for removing oysters from the shell so that a large number of oysters can be processed in a short period of time using the apparatus, thus lowering the cost of the oyster shelling process, and providing fresh oysters at low cost.

In order to achieve the objects, the method of the present invention for removing oysters from the shell (a) uses an adductor muscle cutting apparatus wherein a rectangular frame that rotates 180 degrees about a shaft is installed on the apparatus base, a clamping device which holds the oyster in place and a receiving bar which holds a portion of the oyster shell in place are installed around the periphery of the frame, and which portion of the apparatus base is equipped with a tilting device which can tilt on a hinge with respect to the apparatus base. The method consists of (i) a first process in which the oyster is positioned with the flat surface of its shell facing downward on the surface of the tilting device of the main body of the apparatus, and then the length of the oyster and the angle of inclination of the oyster with respect to the main body of the apparatus when the oyster is held in place are measured using the clamping device so that the stroke and angle of insertion of cutters are detected, (ii) a second process in which the oyster is held in place by the clamping device with portions of the oyster shell in contact with the receiving bar installed on the frame and two sides of the frame, (iii) a third process in which the oyster shell clamped by the clamping device is inverted along with the frame so that the oyster is held in place with the convex surface of the shell facing downward, and (iv) a fourth process that cuts the two end portions of the adductor muscle each between the body of the oyster and the flat surface of the oyster shell and between the body of the oyster and the convex surface of the oyster shell. In this method, the cutting of the adductor muscles, which is the part of oyster that requires the most skill, is quickly accomplished by mechanical means. There is no need to employ skilled workers. Thus, the present invention has a conspicuous effect in reducing the cost of oyster processing.

DETAILED DESCRIPTION OF THE INVENTION

Hereinafter, one embodiment of the present invention will be described with reference to the accompanying drawings.

Figure 1:
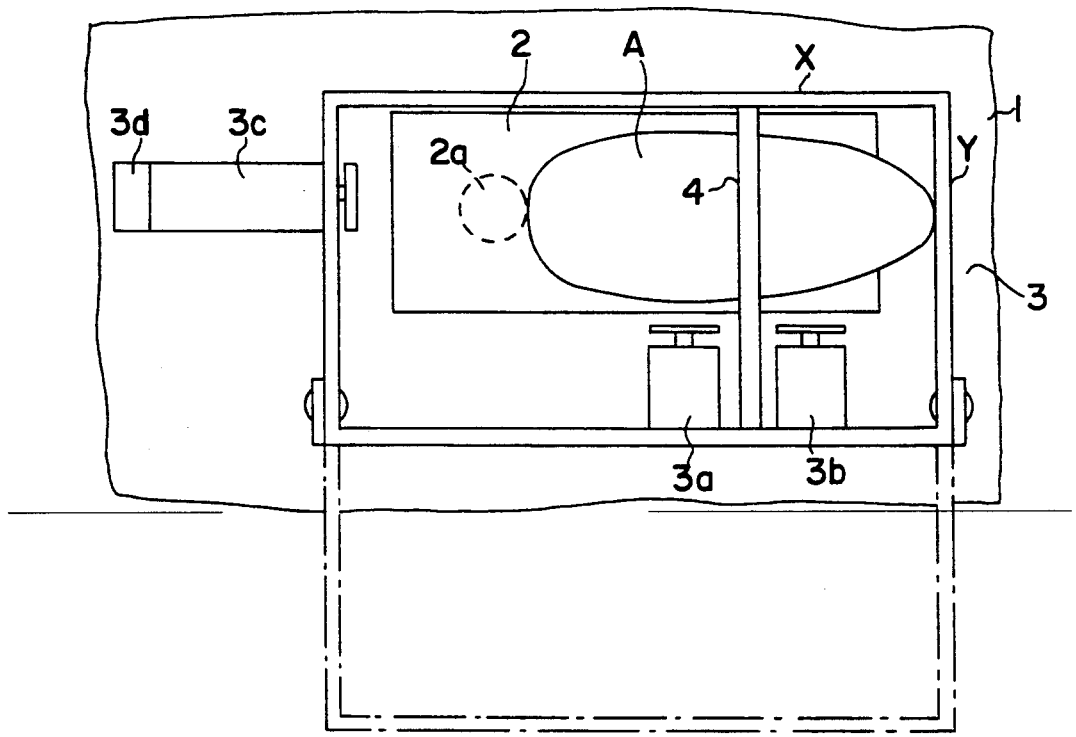
FIG. 1 is a plan view of an apparatus which embodies the method of the present invention, showing an oyster surrounded by a frame.
Figure 2:
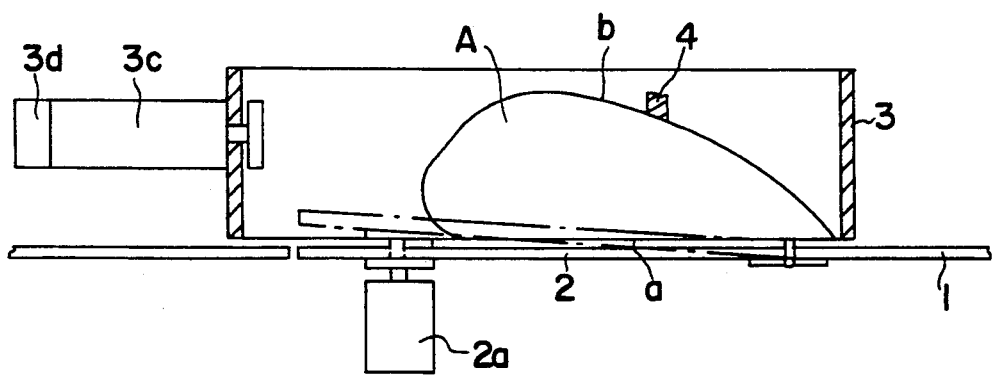
FIG. 2 is a cross section of FIG. 1.

FIGS. 1 and 2 are a plan view and a cross sectional view, respectively, which illustrate the positioning of an oyster shell A placed in a shell holder used in the method for automatically removing oysters from the shell.

First, a rectangular frame 3 which is installed on the main body 1 of the apparatus, which is used in the method of the present invention, is constructed so that it is free to rotate 180 degrees about supporting shafts. The frame 3 is positioned beforehand as indicated by the one-dot chain line in FIG. 1. Afterward, the oyster shell A is conveyed onto the main body 1 of the apparatus by a conveying means such as a belt conveyor, etc.

As indicated by the one-dot chain line in FIG. 2, the conveyed oyster shell A is then positioned so that the flat surface (a) of the shell faces downward on the surface of a tilting device 2 which is installed in the main body 1 of the apparatus. The tilting device 2 is designed so that it can be tilted on a hinge by the action of a cylinder 2a. Afterward, the frame 3 is rotated 180 degrees so that the oyster shell A is surrounded by the frame 3 as shown in FIGS. 1 and 2.

Next, two lateral-direction clamping devices 3a and 3b which are installed on the frame 3 are operated so that the oyster shell A is caused to contact the inside wall on one side (X) of the frame 3. Afterward, both of the clamping devices 3a and 3b return to their original positions.

A longitudinal-direction clamping device 3C operates so that the oyster shell A is caused to contact the inside wall on another side Y of the frame 3. The longitudinal-direction clamping device 3C is installed on the frame 3 in the same manner as the lateral-direction clamping devices so that an axial direction of the longitudinal-direction clamping device is perpendicular to the axial direction of the cylinders of the lateral-direction clamping devices 3a and 3c.

At this time, the length of the oyster shell A in the longitudinal direction is detected by a detector 3d based upon the projecting length of the shaft of the cylinder of the longitudinal-direction clamping device 3c. After this detection is completed, the longitudinal-direction clamping device 3c again returns to its original position.

In other words, the clamping devices 3a, 3b, and 3c operate so that the oyster shell A is positioned in one corner of the frame 3. Furthermore, the length of the oyster shell A is measured from the projecting length of the shaft of the cylinder of the clamping device.

A receiving bar 4 is installed on the upper portion of the frame 3 so as to parallel to the cylinder axial direction of the lateral-direction clamping devices 3a and 3b. This receiving bar 4 functions to support the oyster shell A.

Next, the cylinder 2a of the tilting device 2 is operated so that the tilting device 2 is tilted until a portion of the oyster shell A comes into contact with the receiving bar 4. In this way, the angle of insertion of the second cutter described below used in the cutting process is detected.

With the flat surface (a) of the oyster shell A thus inclined with respect to the upper surface of the main body 1 of the apparatus, the lateral-direction clamping devices 3a and 3b are again operated so that the oyster shell A is fixed in place inside the frame 3. Next, the cylinder 2a of the tilting device 2 returns to its original state.

As a result, one end of the oyster shell A in the direction of length contacts both the surface of the main body 1 of the apparatus and one side Y of the frame 3. The oyster shell is clamped by the lateral-direction clamping devices 3a and 3b and one side X of the frame 3, with one portion of the convex surface of the shell contacting the receiving bar 4.

Figure 3:
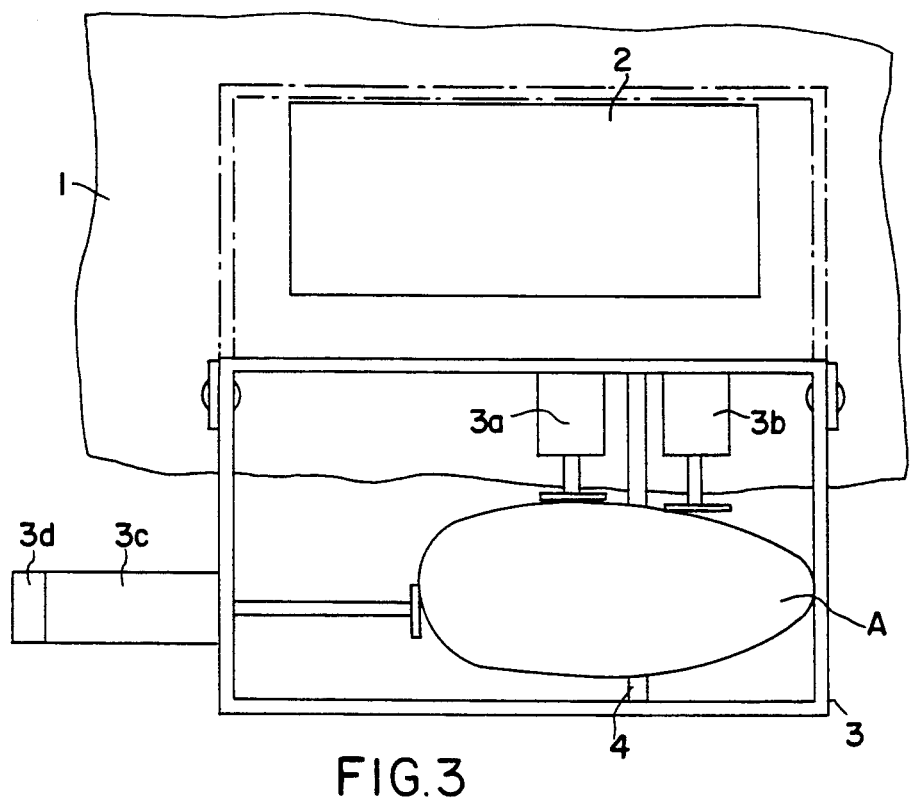
FIG. 3 is a plan view which shows the oyster in the frame rotated 180 degrees.
Figure 4:
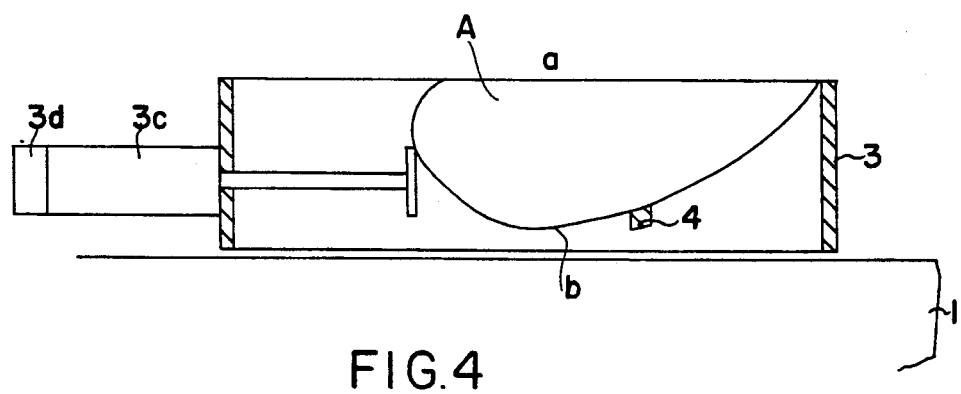
FIG. 4 is a cross section of FIG. 3.

Then, the frame 3 is rotated 180 degrees about the shafts. Thus, the oyster shell A held in place as described above is positioned so that the flat surface (a) of the oyster shell A is exposed upward as shown in FIGS. 3 and 4.

Figure 5:
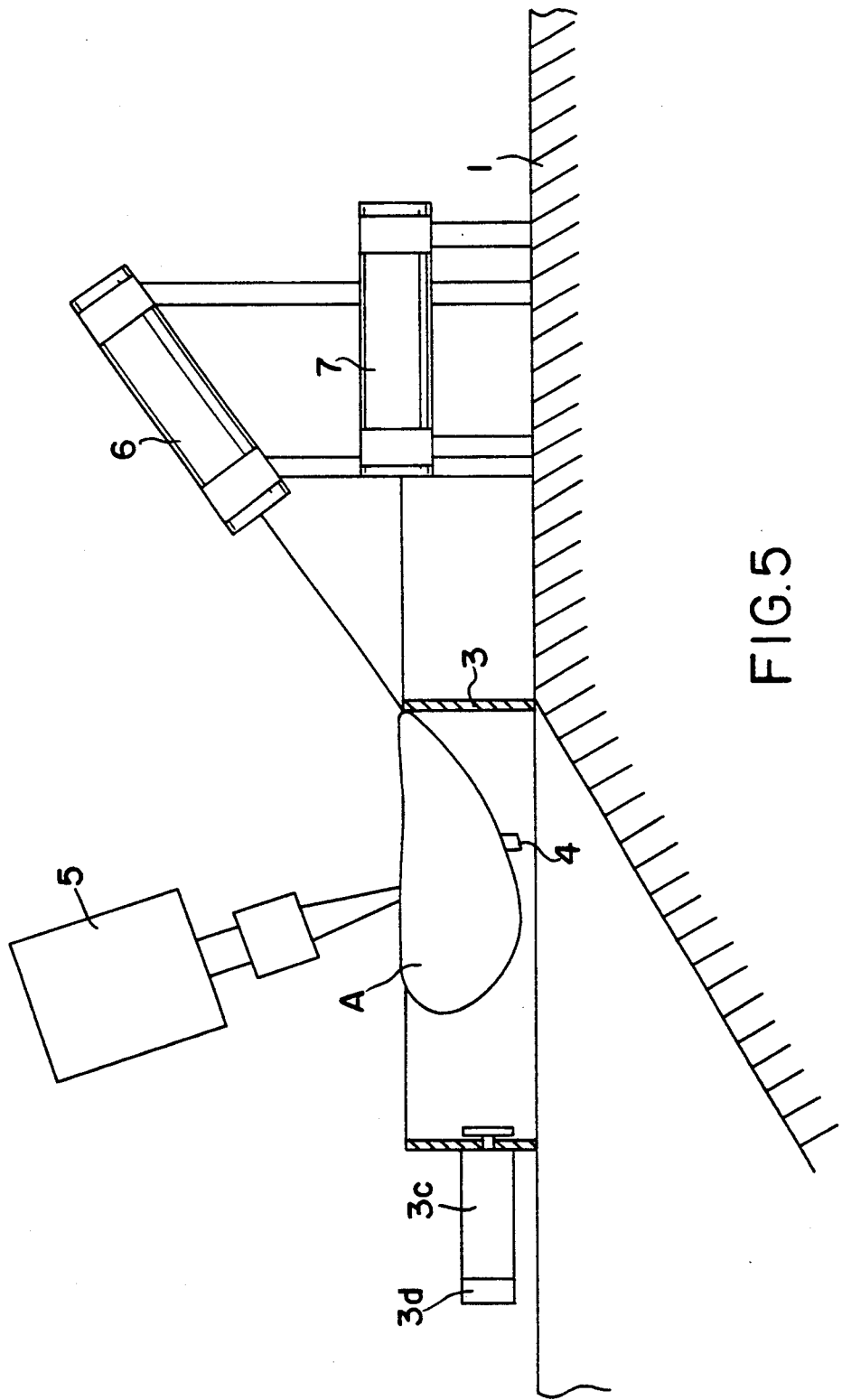
FIG. 5 is an explanatory diagram which illustrates the cutting manner of adductor muscles of an oyster according to the present invention.

In this state, the oyster shell A is held in place in the longitudinal direction and from the above by the longitudinal-direction clamping device 3c and is held in place in the vertical direction by an upper two-stage cylinder 5 as shown in FIG. 5. Furthermore, the oyster shell A is clamped and held in place with respect to all directions (longitudinal, lateral and vertical) by the upper two-stage cylinder 5, receiving bar 4, clamping devices 3a through 3c, and inside of two side walls (X and Y) of the frame 3.

The upper two-stage cylinder 5 is used to increase the length of the extension and retraction of the cylinder so that no interference occurs with the rotation when the frame 3 is rotated 180 degrees. The two-stage cylinder may consist of two cylinders positioned, for example, in series.

In this state, a first cutter 6 (lower cutter) installed on the main body 1 of the apparatus is operated so that the tooth of the cutter 6 is inserted between the upper and lower halves (a) and (b) of the oyster shell A. The cutter 6 then cuts the adductor muscle located between the body of the oyster and the lower half (b) of the oyster shell A.

In this cutting process, the first cutter 6 (lower cutter) is controlled based upon the length of the oyster shell that is measured as described above. In other words, the insertion distance of the first cutter 6 (lower cutter) is determined in accordance with the size of the shell.

At this time, one of the cylinders of the upper two-stage cylinder 5 is retracted to some extent so as to lessen the holding force in the vertical direction, thus facilitating the movement of the first cutter 6 (lower cutter) inside the oyster shell. Furthermore, the upper two-stage cylinder 5 also acts as a stopper which prevents the upper half (a) of the oyster shell A from opening more than necessary when the lower adductor muscle of the oyster is cut.

Figure 6:
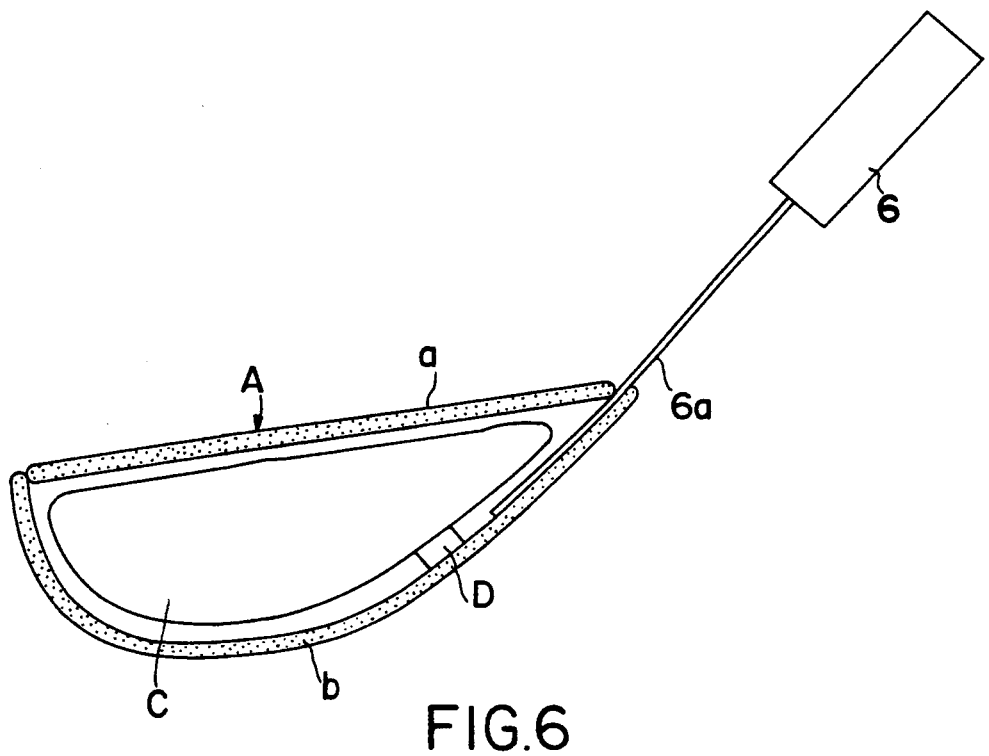
FIG. 6 is a cross sectional view showing the cutting manner of lower side of the adductor muscle of an oyster according to the present invention.
Figure 7:
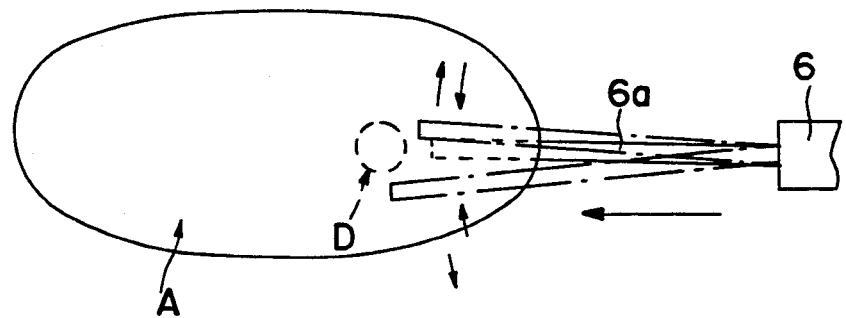
FIG. 7 is a plan view of FIG. 6.

In order to ensure that the first cutter 6 (lower cutter) cuts the adductor muscle regardless of the position of the adductor muscle which may be offset to one side depending on the size of the oyster shell A, it is possible to construct the apparatus so that the blade 6a of the first cutter 6 (lower cutter) is first inserted between the upper and lower halves (a) and (b) of the oyster shell A until the blade 6a reaches the vicinity of the adductor muscle D of the oyster body C, and then the blade 6a cuts the adductor muscle D. During the cutting process, the blade swings right and left along the inside surface of the lower half (b) of the oyster shell A (as shown in FIGS. 6 and 7).

In order to facilitate the cutting of the adductor muscle D and prevent damage to the body of the oyster, air, water, etc., is sprayed thereon by air-pressure or water pressure means during the cutting process. By doing this, the oyster body pressed against the lower shell (b) of the oyster shell A will float up from the bottom half (b), thus making it possible to perform the cutting process much more surely.

After the first cutter 6 (lower cutter) has returned to its original position, a second cutter 7 (upper cutter) is inserted between the two halves of the shell which has been opened to some extent by the insertion of the first cutter 6 (lower cutter).

The angle of insertion of the second cutter 7 (upper cutter) with respect to the oyster shell is detected by the amount of projection of the shaft of the cylinder 2a of the tilting device 2, and the second cutter 7 is operated based upon an angle of insertion which coincides with the detected angle of inclination.

In other words, the second cutter 7 (upper cutter) is inserted almost parallel to the flat surface (a) of the oyster shell A and cuts the adductor muscle which connects the body of the oyster to the upper half (a) of the shell.

In this case as well, if the second cutter 7 (upper cutter) is inserted while being swung in a horizontal direction (in the same manner as the first cutter 6), the adductor muscle is cut with certainty regardless of the size of the shell.

Figure 8:
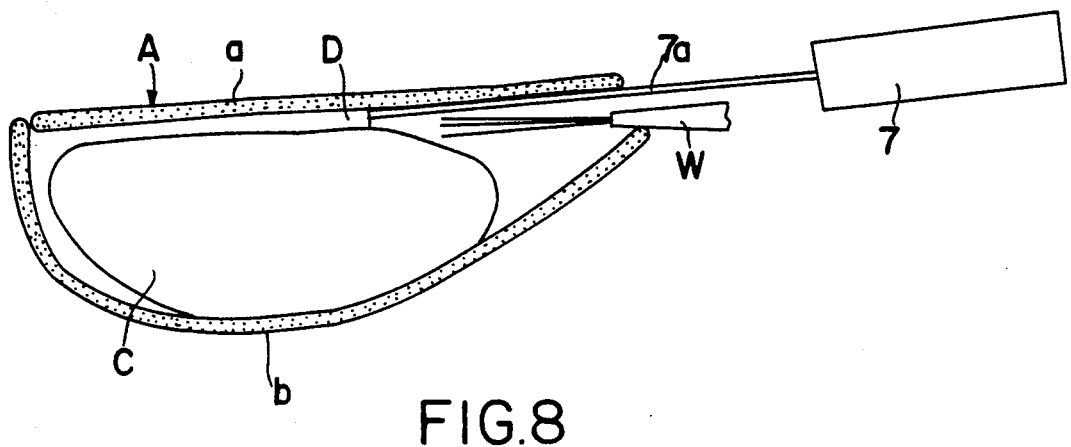
FIG. 8 is a cross sectional view showing the cutting manner of the upper side of the adductor muscle according to the present invention.
Figure 9:
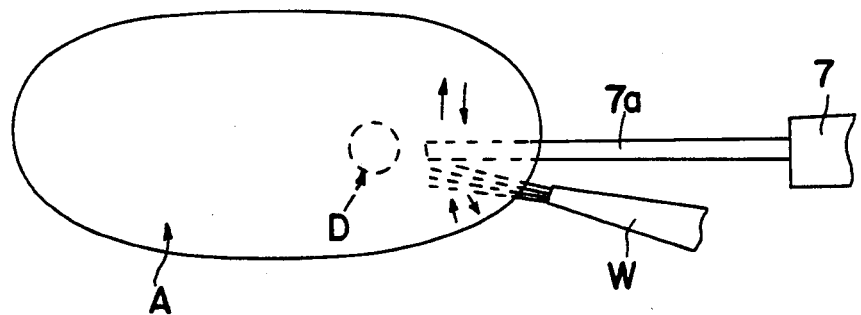
FIG. 9 is a plan view of FIG. 8.

If air, water, etc., is sprayed onto the oyster body by air-pressure or water pressure means W during the cutting process, the oyster body C will be pressed against the lower half (b) of the oyster shell A (as shown in FIGS. 8 and 9). This results in the creation of a gap between the oyster body C and the upper half (a) of the oyster shell A, thus reducing the danger that the oyster body is damaged by the blade 7a of the second cutter 7 (upper cutter), which cuts the adductor muscle while moving along the inside surface of the oyster shell.

After the two portions of the adductor muscle have been cut as described above, the upper two-stage cylinder 5 and the respective clamping devices 3a through 3c release the oyster A. The oyster A is dropped onto a conveying means such as a belt conveyor, etc., thus completing the process. Afterward, the bodies and shells of the thus processed oysters are separated by hand.

Figure 10:
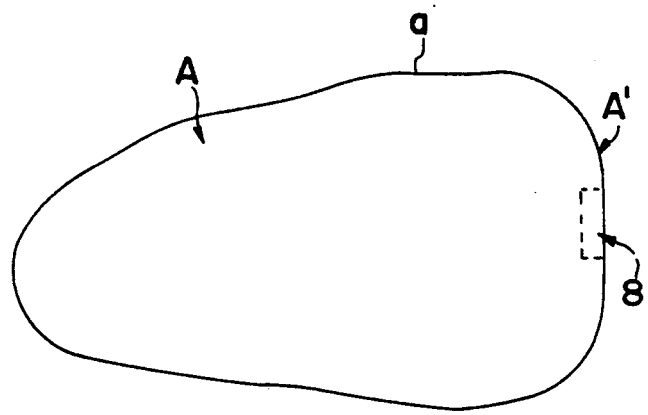
FIG. 10 is a plan view showing an end portion of an oyster shell being cut in order to facilitate the insertion of cutters into the oyster shell according to the present invention.
Figure 11:
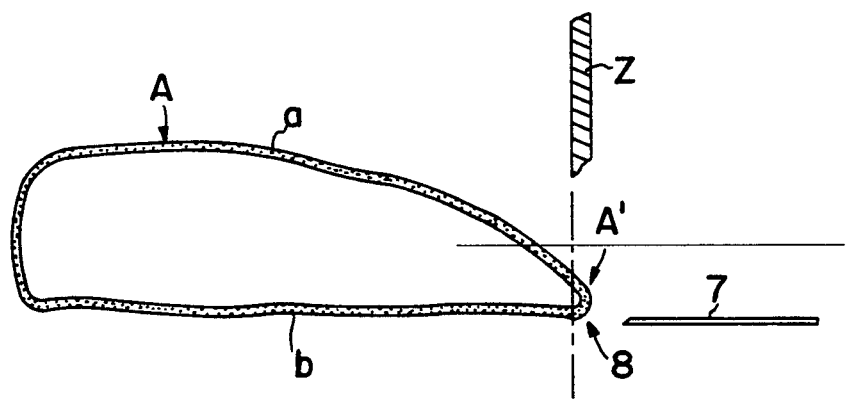
FIG. 11 is a cross sectional view of FIG. 10.

Since oyster shells vary in size and shape, it may be difficult in some cases to accurately insert the first cutter 6 (lower cutter) and second cutter 7 (upper cutter) into the interior of the oyster shell A through the gap between the upper and lower halves (a) and (b) of the shell. In such cases, it is preferable to cut an end portion (A') of the rim of the oyster shell A beforehand by a cutter Z to form a cut-out area 8 (as shown in FIGS. 10 and 11), before the oyster is conveyed to the automatic oyster removing apparatus. In this way, the insertion of the cutters 6 and 7 which are used to cut the adductor muscle is facilitated and made more reliable, so that the working efficiency is further improved.

I claim:

1. A method for automatically removing oysters from the shell characterized in that an oyster still in its shell is positioned with a flat surface of the shell downward, a length of oyster and an angle of the oyster fixed in place are measured so that the stroke and angle of insertion of cutting blades can be determined, the oyster is then turned over and fixed in place so that the convex surface of the shell faces downward, and the body of the oyster is then removed from the shell by using two cutting blades to cut a portion of adductor muscle connecting the body of the oyster to the flat surface of the shell and a portion of adductor muscle connecting the body of the oyster to the convex surface of the shell.

2. An upper cutter operating method characterized in that a body of oyster is moved downward by applying air pressure or water pressure through a gap between upper and lower halves of an oyster shell which is slightly opened, an upper cutter is inserted between the gap until it reaches a vicinity of the upper adductor muscle, and the upper cutter is swung right and left along inside wall surface of the oyster shell so as to cut the adductor muscle.

3. A method for automatically removing oysters from the shell consisting of: a first step in which an oyster is positioned with its flat surface of the shell facing downward, and a length of the oyster and an angle of inclination of the oyster with respect to a main body of an oyster removing apparatus when the oyster is fixed in place are measured using a clamping apparatus of a shell holder, so that the stroke and angle of insertion of each cutting blade are detected; a second step in which the oyster shell is fixed in place using the clamping apparatus of the shell holder, with a portion of said oyster shell contacting a receiving bar installed on a frame of the shell holder; a third step in which the oyster shell clamped by said clamping apparatus is inverted along with said frame so that the oyster is fixed in place with a convex surface of its shell facing downward; and a fourth step in which an adductor muscle between the flat surface of the oyster shell thus fixed in place and the body of said oyster and an adductor muscle between the convex surface of said oyster shell and the body of the oyster are cut.

4. A method for automatically removing oysters from the shell according to claim 3 characterized in that in the process in which the two adductor muscles are cut, a portion of the adductor muscle which is between the body of the oyster and the flat surface of the shell is cut after a portion of adductor muscle which is between the body of the oyster and the convex surface of the shell has been cut.

5. A method for automatically removing oysters from the shell according to claim 3 characterized in that in the cutting process, two portions of the adductor muscle are cut while air or water is sprayed into the cutting area.

6. A method for automatically removing oysters from the shell according to in claim 3 characterized in that in the cutting process, a first cutter is inserted through a gap between upper and lower halves of the oyster shell until said cutter reaches a vicinity of adductor muscle, and said first cutter cuts said adductor muscle while being swung left and right along the inside wall surface of the oyster shell.

7. A method for automatically removing oysters from the shell according to claim 3 characterized that in the cutting process, a second cutter is inserted through a gap between the upper and lower halves of the oyster shell until said cutter reaches a vicinity of adductor muscle, and said second cutter cuts said adductor muscle while being swung left and right along the inside wall surface of the oyster shell.

8. A method for automatically removing oysters from the shell according to claim 3 characterized in that in the cutting process, a first cutter is inserted through a gap between the upper and lower halves of the oyster shell until said cutter reaches a vicinity of adductor muscle, said first cutter cuts said adductor muscle while being swung left and right along the inside wall surface of the oyster shell, and air or water is simultaneously sprayed into the cutting area.

9. A method for automatically removing oysters from the shell according to claim 3 characterized in that in the cutting process, a second cutter is inserted through a gap between the upper and lower halves of the oyster shell until said cutter reaches a vicinity of adductor muscle, said second cutter cuts said adductor muscle while being swing left and right along the inside wall surface of the oyster shell, and air or water is simultaneously sprayed into the cutting area.

10. A method for automatically revolving oysters from the shell according to claim 3 characterized in that a portion of the rim on the flat side of the oyster shell is cut by a cutting means, and first and second cutters are inserted into the oyster shell through the resulting cut-out portion.

* * * * *